Patented Feb. 22, 1944

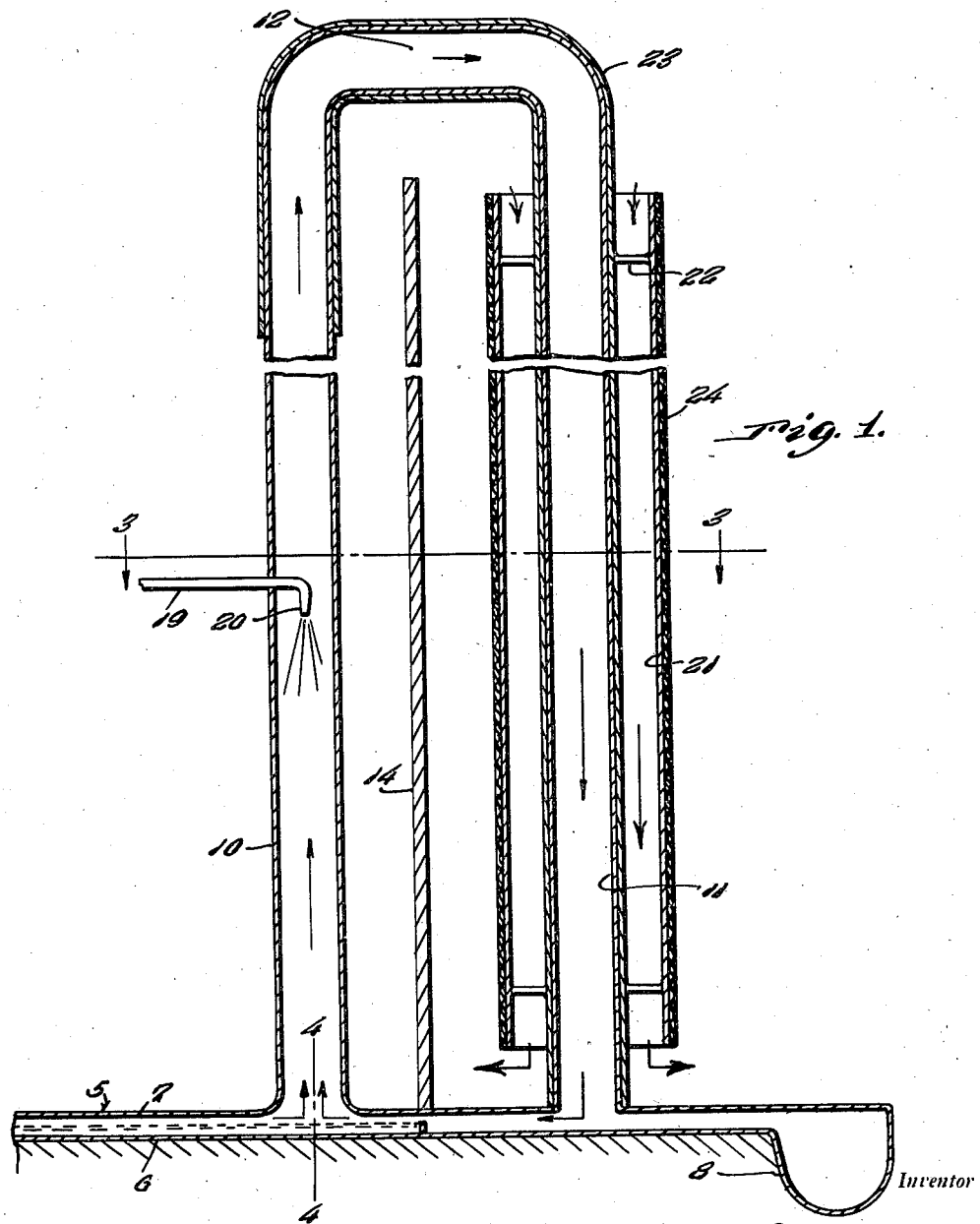

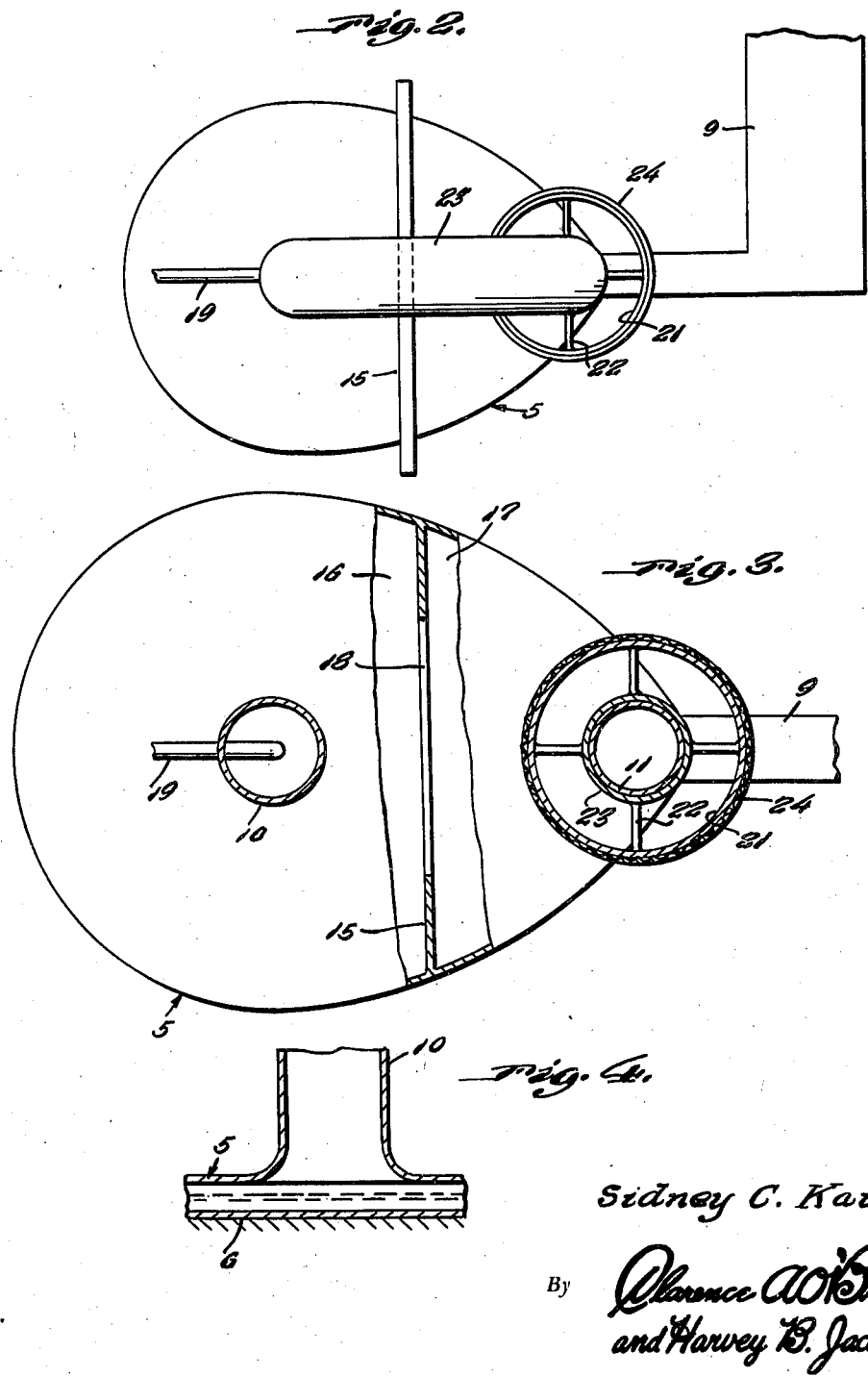

2,342,201

UNITED STATES PATENT OFFICE 2,342,201

DISTILLATION DEVICE

Sidney C. Kain, Tucson, Ariz.

Application March 23, 1942, Serial No. 435,906

7 Claims. (Cl. 202—234)

The present invention relates to new and useful improvements in condensers for extracting salt from salt water and also for reclaiming fresh water therefrom for human consumption and for other purposes.

An important object of the present invention is to provide an apparatus of this character utilizing solar heat for carrying out the evaporation and condensing action of the device and to otherwise provide a practical and economical apparatus of this character adapted for use in warm arid climates adjacent a supply of salt water whereby to produce fresh water therefrom suitable for human consumption and also to reclaim the salt from the salt water.

A further object is to provide a device of this character of simple and practical construction, which is efficient and reliable in use, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout and in which:

Figure 1 is a vertical sectional view.

Figure 2 is a top plan view.

Figure 3 is a horizontal sectional view taken substantially on a line 3—3 of Figure 1 and with part of the evaporating pan broken away to show the separator for the fresh and salt water chambers formed in the pan, and Figure 4 is a fragmentary vertical sectional view of the lower portion of the vapor stack rising from the salt water section of the pan.

Referring now to the drawings in detail, wherein for the purpose of illustration I have disclosed a preferred embodiment of the invention, the numeral 5 designates a flat, shallow pan including a bottom section 6 and top 7, the pan being of any desired area and contour and the bottom 6 is formed at one edge thereof with a drain trough 8 leading to a drain pipe 9.

Rising from the top 7 of the pan, adjacent its central portion, is a metal stack 10 communicating with a similar stack 11 rising from the top of the pan adjacent the trough 8, the stacks 10 and 11 being connected at their top portions by means of a horizontal pipe or stack section 12.

Also rising from the top section of the pan 7 between the stacks 10 and 11 is a separator plate or wall 14 terminating at its upper end adjacent the top of the stack. The separator 14 is preferably positioned nearer the stack 10, as shown to advantage in Figure 1 of the drawings, and the separator extends entirely across an intermediate portion of the surface of the pan 5 with the vertical side edges of the separator projecting outwardly beyond the side edges of the pan, as shown to advantage in Figure 2 of the drawings.

The interior of the pan is formed with a partition or separator 15, defining a salt water chamber 16 and a fresh water chamber 17, the separator 15 being likewise positioned between the stacks 10 and 11 substantially beneath the separator 14 and the upper edge of the separator 15 is formed with an opening 18 providing communication between the chambers 16 and 17 adjacent the underside of the top 7 of the pan.

The chamber 16 is filled with a quantity of salt water up to the level of the opening 18 of the separator 15 so that the portion of the pan at one side of the separator 14 and immediately below the stack 10 is provided with a quantity of salt water of relatively shallow depth.

Projecting into the stack 10 at an intermediate portion thereof, is a salt water supply pipe 19 having a downwardly extending spray tip 20 on its inner end for spraying salt water downwardly in the stack 10, any suitable means for feeding the salt water through the pipe 19 being provided.

Surrounding the stack 11 is a metallic shell 21 secured in spaced relation from the stack by means of supports or braces 22, the lower end of the shell 21 terminating in spaced relation above the top of the pan while the upper end of the shell terminates substantially on a horizontal plane with the top of the separator 14, the bottom and top of the shell being open to permit the free circulation of air therethrough.

The upper portion of the stack 10, the entire stack 11, and the horizontal connecting stack 12 are covered with cloth or similar material 23 and the outer surface of the shell 21 is likewise provided with a cloth or similar covering 24.

In the operation of the device the pan is positioned so that the side of the separator adjacent the stack 10 is exposed to the rays of the sun and so that the separator 14 preferably throws a shadow on the stack 11 and shell 21 to lower the temperature thereof relative to the remaining parts of the device. The cloth coverings 23 and 24 are saturated with salt water and the salt water compartment 16 is supplied with a quantity of salt water to the level of the opening 18 in the partition 15, the level of the water being controlled by a conventional float controlled valve (not shown). A fine spray of salt water is then fed to the stack 10 by means of the pipe 19 and the heat from the sun will cause an evaporation of the salt water in the compartment 16, thereby producing a vapor which rises in the stack 10 and is condensed as it passes through the upper portion of the stack covered by the relatively cooler covering 23 where the moisture carried by the vapor is condensed as it travels downwardly through the stack 11 and resulting in the precipitation of fresh water, which is deposited in the chamber 17 from which it enters the trough 8 for discharge through the pipe 9 for storage or consumption purposes.

After the salt water has been completely evaporated from the compartment 16, the residue, in the form of salt crystals, may be recovered.

Any suitable means may be provided for maintaining the coverings 23 and 24 in a saturated condition.

The upper surface of the pan 5, over the chamber 7, and the exposed surfaces of the stack 10 are preferably painted black to better absorb the sun's rays.

The provision of the shell 21 surrounding the condensation stack 11 acts to produce a secondary cooling effect upon the stack and upon the saturated cloth cover to lower the temperature of the moisture saturated air entering the said stack.

It is believed the details of construction, manner of operation and advantages of the device will be readily understood from the foregoing without further detailed explanation.

Having thus described the invention what I claim is:

1. A distillation unit comprising a shallow pan having a portion thereof arranged to be heated and the remaining portion unheated, means for supplying liquid to the heated portion of the pan, a partition in the pan separating the heated portion of the pan and the unheated portion thereof into a pair of compartments, said partition having an opening adjacent its upper edge to provide for the circulation of air between the compartments, stacks rising from each compartment and communicating at their upper ends, heat exchange means carried by the stack of the unheated compartment to condense moisture in the air rising in the other stack, and means for recovering the products of condensation from said unheated compartment.

2. A distillation unit comprising a shallow pan adapted to contain liquid, a liquid supply means for the pan, a partition in the pan separating the same into a pair of compartments, said partition having an opening adjacent its upper edge to provide for the circulation of air between the compartments, stacks rising from each compartment and communicating at their upper ends, one of said stacks being subjected to solar heat and adapted to create an upward passage of moisture laden air through said one stack, heat exchange means carried by the other stack to precipitate moisture from the air passing therethrough, and drainage means for the compartment of the last-named stack.

3. A distillation unit comprising a shallow pan adapted to contain liquid, a liquid supply means for the pan, a partition in the pan separating the same into a pair of compartments, said partition having an opening adjacent its upper edge to provide for the circulation of air between the compartments, stacks rising from each compartment and communicating at their upper ends, one of said stacks being subjected to solar heat and adapted to create an upward passage of moisture laden air through said one stack, means for cooling the other stack to precipitate moisture from the air passing therethrough, and drainage means for the compartment of the last-named stack.

4. A distillation unit comprising a shallow pan adapted to contain liquid, a liquid supply means for the pan, a partition in the pan separating the same into a pair of compartments, said partition having an opening adjacent its upper edge to provide for the circulation of air between the compartments, stacks rising from each compartment and communicating at their upper ends, one of said stacks being subjected to solar heat and adapted to create an upward passage of moisture laden air through said one stack, means for shielding the other stack from solar heat, means for cooling the said other stack to precipitate moisture from the air passing therethrough, and drainage means for the compartment of the last-named stack.

5. A distillation unit comprising a shallow pan adapted to contain liquid, a partition in the pan separating the same into a pair of compartments, said partition having an opening adjacent its upper edge to provide for the circulation of air between the compartments, stacks rising from each compartment and communicating at their upper ends, means for feeding a liquid spray to one of the stacks, said one stack being subjected to solar heat and adapted to create an upward passage of air therethrough for conveying moisture to the other stack, means for cooling the said other stack for precipitating moisture in said other stack, and drainage means for the compartment of the last-named stack.

6. A distillation unit comprising a shallow pan adapted to contain liquid, a partition in the pan separating the same into a pair of compartments, said partition having an opening adjacent its upper edge to provide for the circulation of air between the compartments, stacks rising from each compartment and communicating at their upper ends, means for feeding a liquid spray to one of the stacks, said one stack being subjected to solar heat and adapted to create an upward passage of air therethrough for conveying moisture to the other stack, a cloth covering on said other stack adapted to be saturated with liquid for condensing moisture laden air in said last-named stack, and drainage means for the compartment of the last-named stack.

7. A distillation unit comprising a shallow pan adapted to contain liquid, a partition in the pan separating the same into a pair of compartments, said partition having an opening adjacent its upper edge to provide for the circulation of air between the compartments, stacks rising from each compartment and communicating at their upper ends, means for feeding a liquid spray to one of the stacks, said one stack being subjected to solar heat and adapted to create an upward passage of air therethrough for conveying moisture to the other stack, an annular shield surrounding the said other stack in spaced relation therefrom, cloth coverings for the shield and said other stack adapted for saturation with liquid to condense moisture laden air in said other stack, and drainage means for the compartment of the last-named stack.

SIDNEY C. KAIN.